US009531706B2

United States Patent
Yang et al.

(10) Patent No.: US 9,531,706 B2
(45) Date of Patent: Dec. 27, 2016

(54) ICON PASSWORD SETTING APPARATUS AND ICON PASSWORD SETTING METHOD USING KEYWORD OF ICON

(71) Applicant: Rowem Inc., Guro-gu, Seoul (KR)

(72) Inventors: Giho Yang, Seoul (KR); Jaeyeob Hwang, Goyang-si (KR)

(73) Assignee: Rowem Inc. (KR)

( * ) Notice: Subject to any disclaimer, the term of this patent is extended or adjusted under 35 U.S.C. 154(b) by 28 days.

(21) Appl. No.: 14/398,712

(22) PCT Filed: May 6, 2013

(86) PCT No.: PCT/KR2013/003916
§ 371 (c)(1),
(2) Date: Feb. 23, 2015

(87) PCT Pub. No.: WO2013/165227
PCT Pub. Date: Nov. 7, 2013

(65) Prior Publication Data
US 2015/0121489 A1      Apr. 30, 2015

(51) Int. Cl.
*H04L 29/06*       (2006.01)
*G06F 21/36*       (2013.01)
(Continued)

(52) U.S. Cl.
CPC ......... *H04L 63/083* (2013.01); *G06F 3/04817* (2013.01); *G06F 21/36* (2013.01); *G06F 21/46* (2013.01)

(58) Field of Classification Search
CPC ..... G06F 21/36; G06F 3/04817; H04L 63/083
(Continued)

(56) References Cited

U.S. PATENT DOCUMENTS 5,371,807 A * 12/1994 Register ............ G06F 17/30707
382/159
2004/0189810 A1 * 9/2004 Aizawa .............. H04N 1/00204
348/207.1
(Continued)

FOREIGN PATENT DOCUMENTS

KR    2000-0024087       5/2000
KR    2006-0118965       11/2006
(Continued)

OTHER PUBLICATIONS

Gao, "A Survey on the use of Graphical Passwords in Security", Jul. 2013, p. 1678-1698.*
(Continued)

*Primary Examiner* — Morshed Mehedi
*Assistant Examiner* — Gregory Lane
(74) *Attorney, Agent, or Firm* — Thorpe North & Western (57) ABSTRACT

Disclosed is an icon password setting apparatus and an icon password setting method, which provide a keyword of an icon for an icon password to be set. The icon password setting apparatus according to the present invention enables password setting using an icon image and an associated keyword, the apparatus comprising: a password management unit for generating or inquiring an icon password; a keyword phrase management unit for generating or inquiring a keyword phrase of the icon password; a password list generating unit for generating a list having each icon password and corresponding keyword phrases; and a user password setting unit for receiving a request for setting the password for the icon password in the list and setting a user password. According to the present invention, a user may easily remember an icon password using the keyword phrase provided when setting the icon password.

9 Claims, 8 Drawing Sheets

(51) Int. Cl.
   *G06F 3/0481* (2013.01)
   *G06F 21/46* (2013.01)
(58) Field of Classification Search
   USPC .......................................................... 726/6, 19
   See application file for complete search history.

(56) References Cited

U.S. PATENT DOCUMENTS

2005/0177754 A1* 8/2005 Pezeshk .................. G06F 21/41
   726/19
2010/0180336 A1* 7/2010 Jones .................... H04L 9/3226
   726/19
2010/0306842 A1* 12/2010 Asano ..................... G06F 21/41
   726/19

FOREIGN PATENT DOCUMENTS

| KR | 2008-0011342 | 2/2008 |
| KR | 10-0812411 | 3/2008 |
| KR | 2008-0044716 | 5/2008 |
| KR | 2008-0109581 | 12/2008 |
| WO | WO 02/054199 | 7/2002 |

OTHER PUBLICATIONS

International Search Report for International Application No. PCT/KR2013/003916 dated Jul. 2, 2013, 4 pages, Korea.

\* cited by examiner

| ICON | MODIFIER 1 | MODIFIER 2 | SUBJECT | PREDICATE |
|---|---|---|---|---|
| | COOL, TO THE BRIM, PLEASANTLY, LIQUORISHLY | DRUNKEN, BRIMMING, ALCOHOLIC | BEER, $00, BOTTOMS UP, GLASS, ALCOHOL, LIQUOR, BARLEY | TAKE A DRINK, DRINK, HAVE A DRINK, GET DRUNKEN, BRIM OVER |
| | PICTURESQUELY, SPLENDIDLY | PICTURESQUE, BRILLIANT, COLORFUL, ARTISTIC | PALLET, ART, PAINTING, DRAWING, ARTIST | DRAW, DEPICT, PAINT |
| | GIGANTICALLY, LIKE AN ELEPHANT | BIG, ELONGATED, HUGE, BRUTAL | ELEPHANT, BIG-NOSED PERSON, NOSE | IS AN ELEPHANT, HAS A BIG NOSE |
| | IN PILES, IN HEAPS | DESIRABLE, DESIROUS, COVETABLE | SHOPPING CART, SHOPPING, BUYING | GO SHOPPING, GO TO MARKET |
| | HAPPILY, DELIGHTFULLY, LOVABLY | LOVELY, HAPPY, FAVORITE, SHY | HEART, MIND, MY MIND, LOVE, HAPPINESS | LOVE YOU, AM HAPPY |
| | QUICKLY, RAPIDLY, ON WHEELS, IN A CAR | QUICK, RAPID, AUTOMOTIVE, AUTOMATIC, RUNNING | CAR, VEHICLE, AUTO, DRIVING, WHEEL | TAKE A CAR, DRIVE A CAR, IS A CAR |

ICON PASSWORD SETTING APPARATUS AND ICON PASSWORD SETTING METHOD USING KEYWORD OF ICON

CROSS-REFERENCE TO RELATED APPLICATION

The present application claims priority to Korean Patent Application No. 10-2012-0047345 filed on May 4, 2012 in the Republic of Korea, the disclosures of which are incorporated herein by reference.

BACKGROUND

1. Field of the Invention

The present disclosure relates to an icon password setting technology, and more particularly, to an icon password setting apparatus that provides an associated phrase using a keyword of an icon and recommends possible icon combinations for a password to allow a password made up of icons to be easily memorized and an icon password setting method.

2. Description of the Related Art

A user password may be made up of numbers, characters, or their combinations. A number password is created by receiving a setting of a password corresponding to an arbitrary digit from a user using key buttons including numbers (for example: 0~9) and special characters (for example: *, #, etc.). A character password is created by receiving a setting a password having an arbitrary digit from a user using key buttons including characters (for example: English alphabet, Korean alphabet). Also, a combination password is a password created by combining numbers and characters.

One of the most important considerations in a user password is security. A user password should be known to a user only, and its security should be maintained without leakage to other users. However, passwords made up of numbers, characters, or their combinations have poor security due to a limited number of key buttons. For example, the numbers are limited to a total of nine from 0 to 9 and the English alphabet is limited to a total of sixteen letters from A to Z. Also, a combination password is limited to a sum of numbers and English alphabets, i.e., about forty. Here, about forty key buttons are used in a daily life and commonly identifiable, and consequently, they are known to everyone. The combination password has advantage of being very familiar and not causing confusion, but has a disadvantage of poor security. For most of the passwords, an input display provides about forty or less key buttons that are standardized and identifiable. For example, some of the forty key buttons known to everyone are arranged and displayed on a door of a user, an Internet login page of the user, a mobile communication terminal unlocking page of the user, and the like. Also, if a third party peeps a password input process of the user, it is not difficult for the third party to identify characters selected by the user in a state that the third party already knows the about forty key button arrangement.

Meanwhile, an icon password is created using an image of an icon displayed on a key button. The icon password is not limited to roughly forty like the combination password, and a number of its images is infinite. For example, assume that a password is created using four icon images selected in a sequential order among twenty icon images. In the case of a combination password, twenty selected among forty key buttons are determined as an icon image, but in the case of an icon password, twenty among an infinite number of images may be selected and determined as an icon image. Thus, an icon password may be displayed as different images on a door of a user, an Internet login page of the user, a mobile communication terminal unlocking page of the user, and the like, thereby providing enhanced security. However, an icon image is not familiar, and in the presence of an infinite number of images, even a user may forget an icon password of the user even though the user directly set the password.

SUMMARY

The present disclosure is designed to solve the problem of the related art, and therefore the present disclosure is directed to providing an icon password setting apparatus that recommends an icon password by providing a possible icon password combination among icon key buttons and an associated keyword phrase, and receives a setting of an icon password by referring to the meaning of the keyword phrase, and an icon password setting method.

To achieve the objects, an icon password setting apparatus using a keyword of an icon according to the present disclosure performs password setting based on an icon using a keyword associated with an image of the icon, and includes a password management unit configured to combine a plurality of icons among an entire icon to generate a plurality of possible icon passwords for a password, or to retrieve pre-stored icon passwords, a keyword phrase management unit configured to combine keywords of the individual icons constituting the icon password to generate keyword phrases, or to retrieve pre-stored keyword phrases corresponding to the icon passwords, a password list generating unit configured to generate a list including the icon passwords and the corresponding keyword phrases, and a user password setting unit configured to receive a request for password setting for the icon password selected from the list, and set the icon password as a user password.

In the present disclosure, the icon password setting apparatus may be constructed as a local user terminal of a stand-alone environment or a server of a wired/wireless network environment, and when the icon password setting apparatus is constructed as the server, the icon password setting apparatus may be configured to transmit the list using the network and receive the icon password selected by a user from the list.

According to one aspect of the present disclosure, the icon password setting apparatus may further includes an icon registration unit configured to register an icon and at least one keyword associated with an image of the icon.

Here, the icon password setting apparatus may be configured to sort and store the registered keyword into any one category among a plurality of categories including constituents of sentence and parts of speech.

Also, the icon password setting apparatus may be configured to generate a keyword phrase of the icon password in accordance with a combination rule using the category of the keyword.

Moreover, the icon password setting apparatus may further include a user password authentication unit configured to receive a request for user authentication of the icon password selected by the user, compare the requested icon password to the pre-stored user password, and determines user authentication as a success when the requested icon password matches the pre-stored user password.

According to another exemplary embodiment, the icon password setting apparatus which performs password setting based on an icon using a keyword associated with an image of the icon, includes a password management unit configured to combine a plurality of icons among an entire icon to generate a plurality of possible icon passwords for a password, or to retrieve pre-stored icon passwords, a keyword phrase management unit configured to combine keywords of the individual icons constituting the icon password to generate keyword phrases, or to retrieve pre-stored keyword phrases corresponding to the icon passwords, a password setting management unit configured to receive a selection of an icon password using a setting display where icons are arranged, and provide the keyword phrases corresponding to the icon passwords to the setting display, and a user password setting unit configured to receive a request for password setting for the icon password selected through the setting display, and set the icon password as a user password.

To achieve the objects, an icon password setting method using a keyword of an icon according to the present disclosure enables an icon password setting apparatus to perform password setting based on an icon using a keyword associated with an image of the icon, and includes (a) a password management step for combining a plurality of icons among an entire icon to generate a plurality of possible icon passwords for a password, or retrieving pre-stored icon passwords, (b) a keyword phrase management step for combining keywords of the individual icons constituting the icon password to generate keyword phrases, or retrieving pre-stored keyword phrases corresponding to the icon passwords, (c) a password list generating step for generating a list including the icon passwords and the corresponding keyword phrases, and (d) a user password setting step for receiving a request for password setting for the icon password selected from the list, and setting the icon password as a user password.

According to one aspect of the present disclosure, a setting of an icon password with enhanced security may be received from a user, and when the user selects a plurality of icons set as the password, association of a password phrase received when setting may be helpful the user easily recollect the icon password.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

<1. System Architecture>

Figure 1:
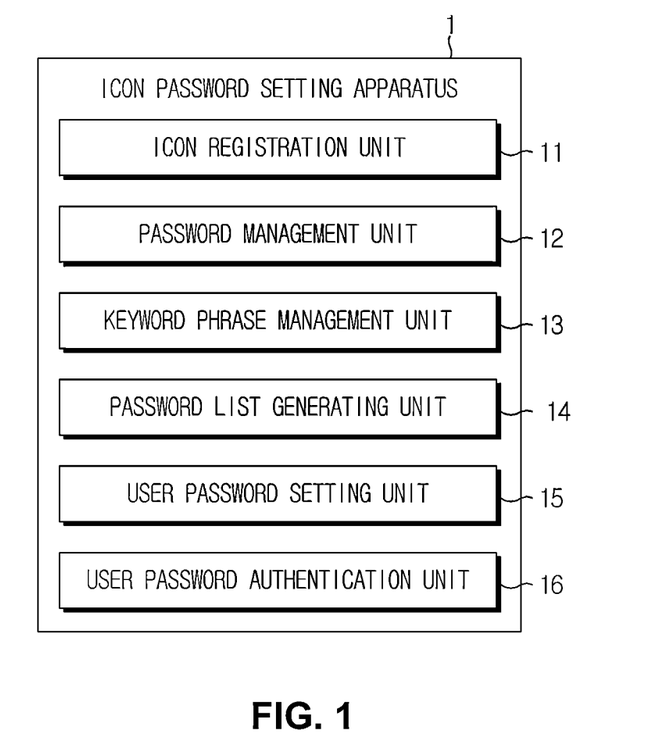
FIG. 1 is a schematic diagram illustrating a configuration of an icon password setting apparatus according to an exemplary embodiment of the present disclosure.

FIG. 1 is a schematic diagram illustrating a configuration of an icon password setting apparatus according to an exemplary embodiment of the present disclosure.

The icon password setting apparatus 1 according to an exemplary embodiment of the present disclosure is configured to include a password management unit 12 to generate or retrieve an icon password, a keyword phrase management unit 13 to generate or retrieve a keyword phrase corresponding to the icon password, a password list generating unit 14 to generate a list including the generated password and the generated keyword phrase, and a user password setting unit 15 to set an icon password selected by a user through the list as a user password.

Here, the password server 3 may be configured to further include an icon registration unit 11 and a user password authentication unit 16.

The icon password setting apparatus 1 may be constructed as an independent terminal of a stand-alone environment, and includes a computer terminal (for example: desktop, laptop, etc.) and a smart terminal (for example: smart phone, smart pad, etc.). The icon password setting apparatus 1 may download and install an application, and execute the installed application to perform the setting and authentication processing of a user password in a local environment. For unlocking, application execution, and other processing requiring user authentication in the icon password setting apparatus 1, the application receives a setting of a password using an icon, and authenticates the set password. The application may be embedded as an operating system of the icon password setting apparatus 1.

Preferably, the icon password setting apparatus 1 provides a password setting display where a plurality of icons are arranged as key buttons by the application, and is requested to set a password when receiving a selection of a plurality of icons as a user password from the user. Then, the application stores the plurality of icons selected by the user as a user password in the icon password setting apparatus 1. In this instance, the user needs to memorize images of the plurality of icons selected as a password in a selection order.

Afterwards, when a password input event occurs, the application receives an input of an icon password from the user, compares it to the pre-stored user password, and when the icons are found identical, determines password authentication as a success.

Also, to allow the user to easily memorize the plurality of icons set as a password, the application matches to a keyword and stores for each icon. The keyword is not limited to a specific type if it is intuitively associated with an icon image. Because the user sets a password using the icon and recalls its meaning from the keyword phrase, the user may easily memorize the icon password.

The icon registration unit 11 registers and stores the icons corresponding to the icon password. Each icon has an image that is unique and identifiable, and the image is not limited to a specific type and includes various designs, for example, numbers, characters, figures, pictures, etc.

Here, the icon registration unit 11 may register and store at least one keyword to allow the user to easily memorize the icon image. Also, when a plurality of keywords is registered, the icon registration unit 11 may sort and store the icons using a category, for example, constituents of sentence (for example: a subject, a predicate, a modifier, etc.), and parts of speech (for example: a noun, a verb, an adjective, an adverb, etc.). The category may be a user defined category, for example, a first syntactic word, a second syntactic word, a first classifier word, a second classifier word, etc. When the registration of the icons and the keywords mapped to the icons is completed, each of the registered icons may be displayed as a key button on a password input display of the user.

Also, the icon registration unit 11 may register latest data through update processing by downloading data of the icons and the keywords from a server through version management.

The password management unit 12 may combine each of the registered icons to generate a password available as an icon password. The password management unit 12 may generate an icon password or retrieve a pre-stored icon password each time a password setting event occurs. For example, assume that twenty unique icons are registered and an icon password contains two digits, the password management unit 12 may combine the icons to generate three hundred eighty (20×19=380) unique passwords. Alternatively, the password management unit 12 may retrieve three hundred eighty icon passwords stored in the icon password setting apparatus 1. The three hundred eighty passwords are candidate passwords from which any one may be selected as a user password by the user.

The keyword phrase management unit 13 may combine the keywords of the icons for each of the generated icon passwords to generate a keyword phrase. The keyword phrase management unit 13 may combine the keywords of the icons included in the icon password to generate a keyword phrase, or may retrieve a keyword phrase of the pre-stored icon password. Referring back to the previous example, for each of the three hundred eighty icon passwords, a keyword phrase is generated, so a total of three hundred eighty keyword phrases is generated. It is obvious that a plurality of keyword phrases may be generated for each icon password.

Here, in the generation of the keyword phrase, the keyword phrase management unit 13 may arbitrarily extract a keyword from at least one keyword allocated to each of the icons included in the icon password, and combine the extracted keywords to generate a keyword phrase. Also, the keyword phrase management unit 13 may extract keywords from a plurality of keywords allocated to each of the icons using a combination rule, and combining the extracted keywords to generate a keyword phrase.

For example, the combination rule may make the keyword phrase more significant using the keyword category. That is, in the case of a password made up of two icons <icon1, icon 2>, a combination rule may be <modifier 1, modifier2>, <modifier, subject>, <subject, predicate>, and <modifier 1, predicate>. Also, in the case of a password made up of three icons <icon1, icon 2, icon 3>, a combination rule may be <modifier 1, modifier2, subject>, and <subject, modifier, predicate>. It is obvious that the keyword combination rule may differ for each language. Also, in the case of the Korean language, a combination rule by which a keyword phrase is generated using a modified keyword generated by adding an ending or a postposition to the registered keyword for a semantic combination may be possible. Here, the combination rule is used to improve the semantic completion, and the keyword phrase may not be necessarily semantically complete. Even a semantically incomplete and irrelevant keyword phrase in the context may be variously interpreted by the user, and rather, the user may prefer an irrelevant meaning.

Also, the icon password setting apparatus 1 may map the semantically complete keyword phrase to the icon password and store it. Then, the keyword phrase management unit 13 may retrieve a pre-stored keyword phrase using the icon password as a search key. Also, the keyword phrase management unit 13 may register a keyword phrase associated with the images of the combined icons for each icon password. When the keyword phrase is registered, a more semantically complete keyword phrase may be registered.

The password list generating unit 14 displays the keyword phrase for each icon password, generates a list of password candidates, and displays it on a screen of the icon password setting apparatus 1. Then, the user may ascertain the icon password and the keyword phrase through the list, select any one password candidate, and request registration as a user password. That is, the password list generating unit 14 may generate a list and recommend as a candidate for icon password. Obviously, the list may have various interfaces and display types, and all the candidate passwords may not be necessarily recommended, and at least one candidate password may be recommended.

The user password setting unit 15 receives a selection of any one password from the user through the displayed list and receives a request for setting as a user password. Then, the user password setting unit 15 stores the selected icon password as a user password in the icon password setting apparatus 1.

The user password authentication unit 16 provides a password input display to the screen of the icon password setting apparatus 1 and receives a selection of an icon password from the user. The user password authentication unit 16 compares the selected icon password to the pre-stored user password, and when they are found identical, determines authentication as a success. The user password authentication unit 16 may display the determined authentication result on the screen.

Figure 2:
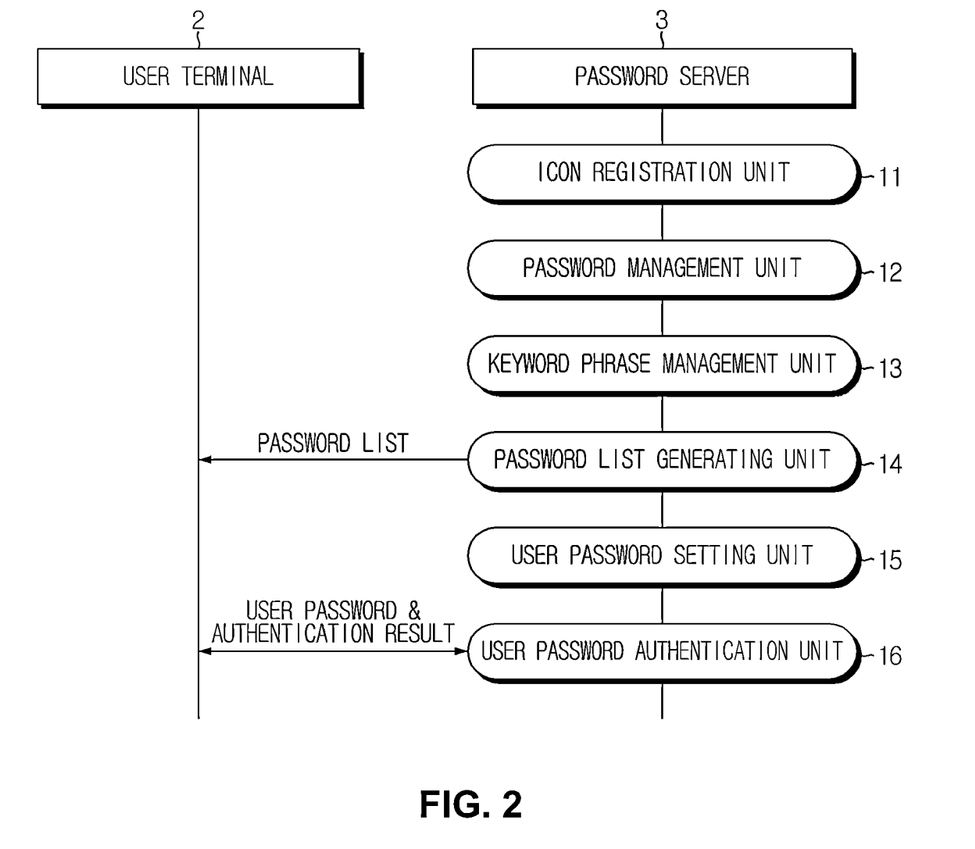
FIG. 2 is a schematic diagram illustrating an internal structure of an icon password setting apparatus according to another exemplary embodiment of the present disclosure.

FIG. 2 is a schematic diagram illustrating an internal structure of an icon password setting apparatus 1 according to another exemplary embodiment of the present disclosure.

According to another exemplary embodiment of the present disclosure, the icon password setting apparatus 1 of FIG. 1 may be constructed as a password server 3 based on wired/wireless network communication. Also, the password server 3 may receive a setting of an icon password from a user terminal 2 accessed via a network, and provide the user terminal 2 with an icon password authentication processing service.

The components of the icon password setting apparatus 1 described in FIG. 1 may be equally applied to the password server 3 according to another exemplary embodiment of the present disclosure, but there is a difference in that data communication via a wired/wireless network is involved. The following description is made based on the difference.

In the present disclosure, the wired/wireless network includes any communication network allowing Internet data communication using various protocols, for example, a wireless/wireless public network such as a mobile communication network or Internet, or a private network.

The user terminal 2 includes a computer terminal (for example: desktop, laptop, etc.) and a smart terminal (for example: a smart phone, a smart pad, etc.). The user terminal 2 connects to the password server 3 using a web browser or a dedicated application, selects a plurality of icons as a user password, and requests password registration. In this instance, the user needs to memorize images of the icons selected as the password.

The password server 3 is configured to include the password management unit 12, the keyword phrase management unit 13, the password list generating unit 14, and the user password setting unit 15 to receive an icon password selected by a user through a list and set the icon password as a user password.

Here, the password server 3 may be configured to further include the icon registration unit 11 and the user password authentication unit 16.

The password list generating unit 14 displays a keyword phrase for each icon password in response to the request from the user terminal 2, generates a list of password candidates, and transmits it to the user terminal 2. Then, the user may ascertain the icon password and the keyword phrase through the list, select any one password candidate, and request registration as a user password.

The user password setting unit 15 receives any one password from the user terminal 2 through the displayed list and receives a request for setting as a user password. Then, the user password setting unit 15 stores the received icon password as a user password in the password server 3.

The user password authentication unit 16 provides a password input display to the user terminal 2, and receives an icon password inputted by the user from the user terminal 2 through the password input display. The user password authentication unit 16 compares the received icon password to the pre-stored user password, and when they are found identical, determines authentication as a success. Also, the user password authentication unit 16 may provide the determined authentication result to the user terminal 2 in response to the request.

Figure 3:
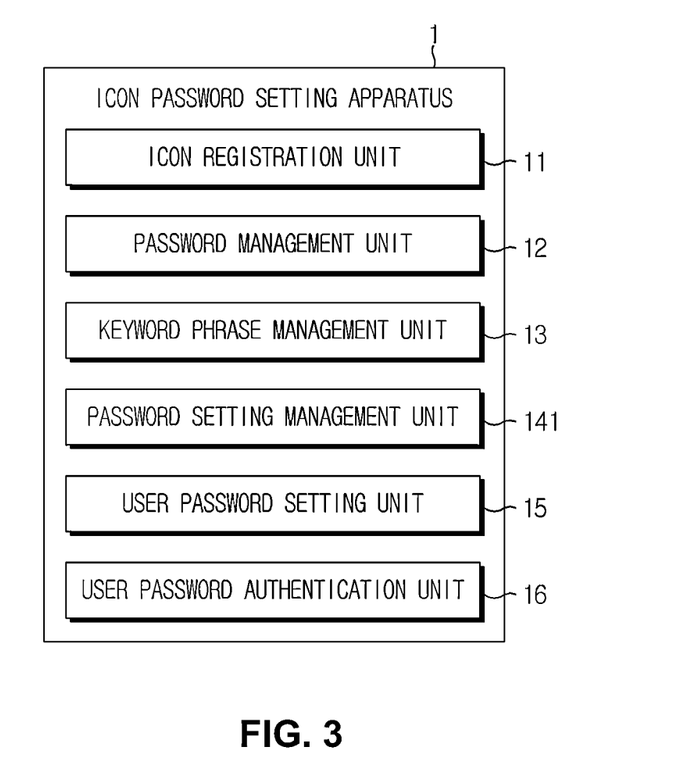
FIG. 3 is a schematic diagram illustrating an internal structure of an icon password setting apparatus according to further another exemplary embodiment of the present disclosure.

FIG. 3 is a schematic diagram illustrating an internal structure of an icon password setting apparatus according to further another exemplary embodiment of the present disclosure.

The icon password setting apparatus 1 according to further exemplary embodiment of the present disclosure is configured to include the icon registration unit 11, the password management unit 12, the keyword phrase management unit 13, a password setting management unit 141, the user password setting unit 15, and the user password authentication unit 16.

Here, the icon password setting apparatus 1 according to further exemplary embodiment of the present disclosure includes the configuration of the icon password setting apparatus 1 of FIG. 1 and the password server 3 of FIG. 2. However, there is a difference in that the icon password setting apparatus 1 of FIG. 3 provides a keyword phrase for an icon password arbitrarily selected by the user without recommending a candidate password, dissimilar to the disclosure of FIGS. 1 and 2. Thus, the disclosure of FIGS. 1 and 2 may be equally applied to the disclosure of FIG. 3, and the following description is made based on the difference.

When a password setting request event occurs, the password setting management unit 141 generates display information for password setting and displays the information on the screen. Icons are arranged as key buttons and displayed on a password setting display. Each time the user selects an icon password through the setting display, the password setting management unit 141 generates or retrieves a keyword phrase corresponding to the selected icon password and displays it on the screen. Then, when the user arbitrarily selects an icon password, the user receives a corresponding keyword phrase, so the user may set a desired icon password as a user password.

Although the foregoing description is provided under the assumption that the password setting management unit 141 is an independent terminal similar to the icon password setting apparatus 1 of FIG. 1, the password setting management unit 141 may be a component of the password server 3 of FIG. 2. When the password setting management unit 141 is included in the password server 3, the password setting management unit 141 provides a password setting display to the user terminal 2, receives a candidate for icon password selected on the setting display from the user terminal 2, and provides a keyword phrase corresponding to the received icon password.

Figure 4:
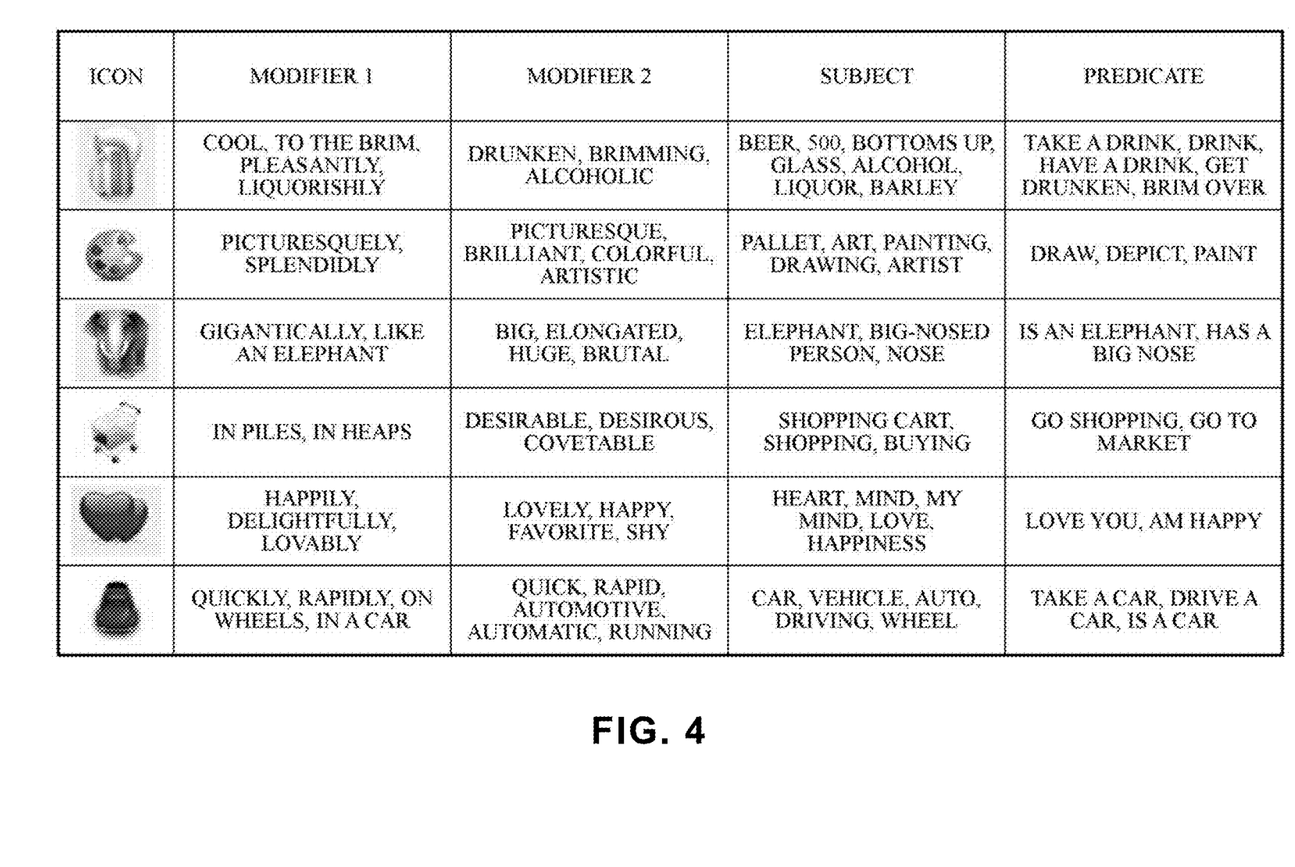
FIGS. 4 through 7 are diagrams illustrating the use of an icon password according to the present disclosure.

FIG. 4 illustrates a mapping table of the icon and the keyword according to the present disclosure.

The mapping table has categories "modifier 1", "modifier 2", "subject" and "predicate". Also, a keyword associated with an icon image is sorted into each category and mapped to an icon. Keyword sorting may be performed various categories as well as the categories illustrated in FIG. 4, and mapping at least one keyword to an icon may suffice.

When a plurality of keywords is mapped to an individual icon, the password server 3 may extract any one keyword among keywords belonging in a category group using a combination rule defining a category arrangement order, and combine the extracted keywords to generate a keyword phrase of the icon password.

The mapping table is stored in the icon password setting apparatus 1. The icon password setting apparatus 1 may generate a candidate password for an icon password in real time by referring to the mapping table, each time an icon password setting event occurs. Alternatively, the icon password setting apparatus 1 may retrieve a pre-stored icon password as a candidate. Then, the candidate password determined by a generation or retrieval method may be displayed on the screen of the icon password setting apparatus 1.

Figure 5:
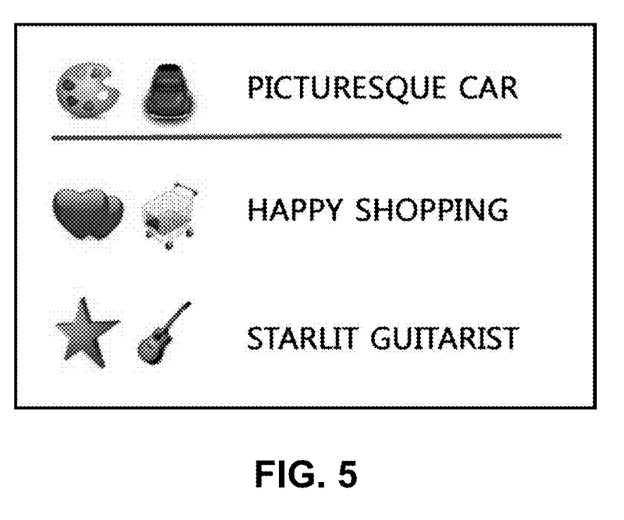

FIG. 5 illustrates the icon password and the keyword phrase according to the present disclosure.

The icon password has multiple digits. In FIG. 5, for convenience of description, an icon password of two digits is illustrated. The user selects two icons of desired images in a sequential order and registers as an icon password, and because each icon has a variety of unique images, the user has difficult in memorizing the two icons selected by the user as a user password.

Thus, if the user ascertains an icon password made up of a combination of the two icons in a sequential order and a corresponding keyword phrase and sets the icon password as a user password, the user will easily recollect the icon password when the user is required to input the icon password later. For example, the user may have difficulty in recollecting an image of an icon password made up of a combination of a palette icon and a car icon, but association of a keyword phrase "picturesque car" may be helpful the user memorize more easily. It is obvious that afterwards the user may easily select, as a password, the icon image set by the user through the keyword phrase on the password input display where key buttons are arranged for each icon.

The icon password setting apparatus 1 may store the icon and the keyword of the icon, or may store the icon password and the keyword phrase of the icon password. In the former case, the icon password setting apparatus 1 retrieves the keywords corresponding to the icons of the icon password and combines the keywords into the keyword phrase. In the latter case, the icon password setting apparatus 1 may retrieve the corresponding keyword phrase using the icon password as a search key.

Figure 6:
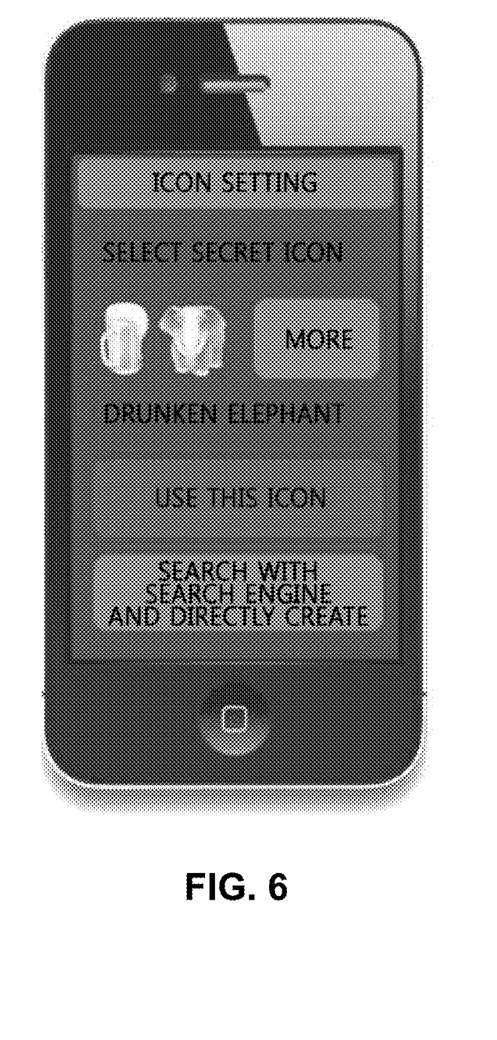

FIG. 6 illustrates the screen of the user terminal 2 according to the present disclosure, on which the icon password and the keyword phrase are displayed.

The user terminal 2 may be the icon password setting apparatus 1 of FIG. 1, and may be the client terminal of FIG. 2. For convenience of description, assuming the user terminal 2 corresponds to the icon password setting apparatus 1 of FIG. 1 and is a smart phone.

The smart phone displays a corresponding keyword phrase for one icon password. When the user likes the displayed icon password, the user may press a "setting" button to request the setting of the displayed icon password as a user password. Also, when the user would like to receive a recommendation of other icon passwords, the user may press a "more" button to retrieve other icon passwords and keyword phrases.

When the "more" button is selected, the smart phone combines or retrieves other icon passwords in real time. The smart phone combines or retrieves keyword phrases corresponding to the determined icon passwords in real time. Also, the smart phone displays the determined icon passwords and keyword phrases on the screen.

Although FIG. 6 illustrates a list including one candidate password, a list including all candidate passwords may be displayed.

Figure 7:
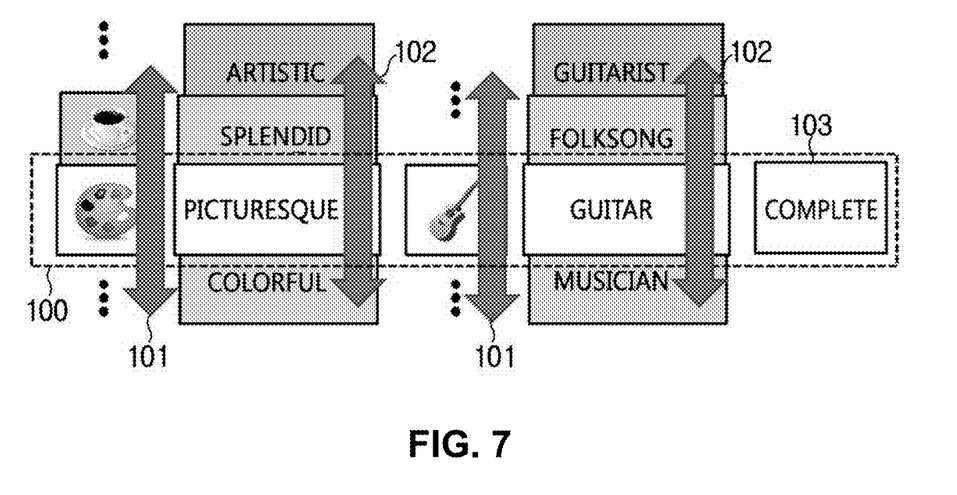

FIG. 7 illustrates a dial-style password setting display according to the present disclosure.

For convenience of description, assumption is that the icon password setting apparatus 1 of FIG. 1 receives a setting of an icon password of two digits.

On the screen of the icon password setting apparatus 1, the dial-style interface 100 is displayed. The user may retrieve icons by a touch manipulation of an icon dial 101. When there is a change in icon, a keyword corresponding to the changed icon is displayed. The user may retrieve keywords of a current icon by a touch manipulation of a keyword dial 102. The user sets the desired icon password and keyword phrase by manipulating the icon dial 101 and the keyword dial 102, and presses a "complete" button 103 to request the setting of the icon password. Then, the icon password setting apparatus 1 stores the requested icon password as a user password.

<2. Method Configuration>

An icon password setting method using a keyword of an icon according to an exemplary embodiment of the present disclosure may be preferably implemented through construction of the above icon password setting system 1.

Figure 8:
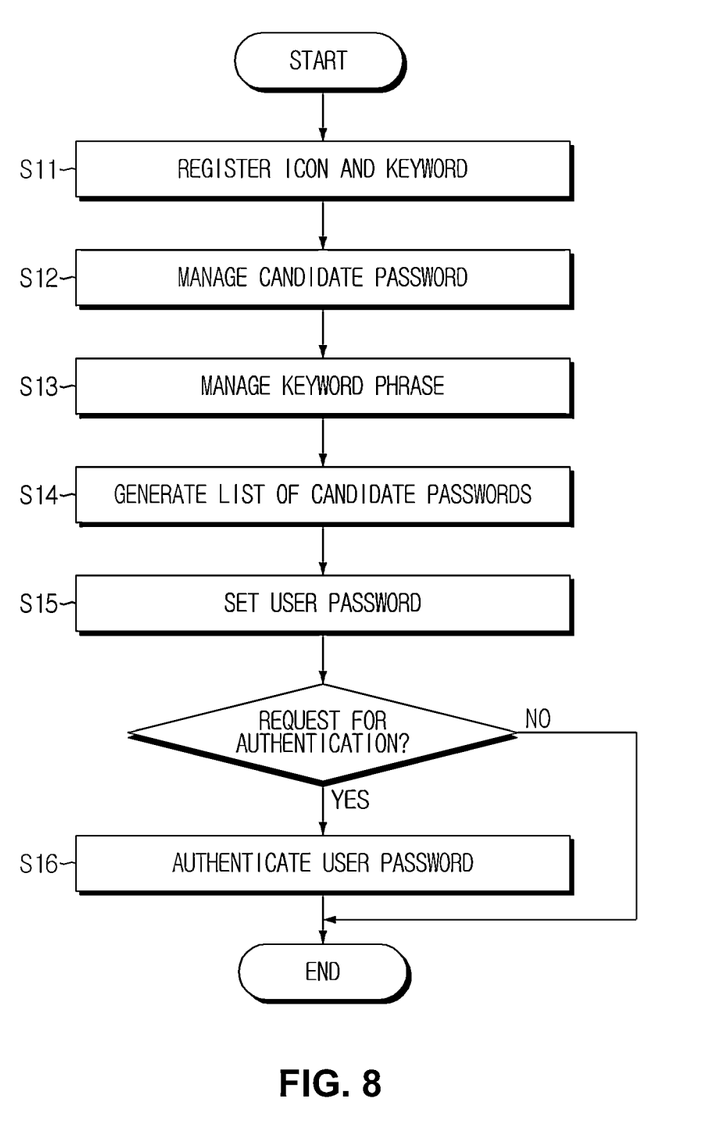
FIG. 8 is a flowchart schematically illustrating an icon password setting method according to the present disclosure.

FIG. 8 is a flowchart schematically illustrating an icon password setting method according to the present disclosure.

The icon password setting apparatus 1 registers and stores an icon selectable as a password and at least one keyword mapped to the icon (S11).

Here, the icon password setting apparatus 1 may sort the registered keyword into a category and store it. When the icon is registered, the icon password setting apparatus 1 may display a password setting display where the registered icon is displayed as a key button.

Also, the icon password setting apparatus 1 may store a candidate of icon password and a corresponding keyword phrase, instead of keywords corresponding to each icon.

Further, the application of the icon password setting apparatus 1 may perform update processing by downloading data of the icon and the keyword from a server through version management.

After the icon registration is completed, when a password setting event occurs, the icon password setting apparatus 1 combines each icon in conformity with the digit of the password to generate a candidate password (S12). The candidate password is a collection of possible passwords that may be created using the registered icon. Also, the icon password setting apparatus 1 may retrieve a pre-stored candidate password rather than generating the candidate password.

When the candidate password is determined by the generation or retrieval method, the icon password setting apparatus 1 combines keywords corresponding to each candidate password to generate a keyword phrase (S13).

Here, when a plurality of keywords is mapped to any one icon, the icon password setting apparatus 1 may arbitrarily extract keywords among the plurality of keywords and generate a keyword phrase. Also, when the plurality of keywords is sorted into categories, the password server 3 may extract keywords by referring to a combination rule defining a category combination, and combine each of the extracted keywords to generate a keyword phrase. Also, the icon password setting apparatus 1 may retrieve a pre-stored keyword phrase rather than combining the candidate passwords.

Subsequently, the icon password setting apparatus 1 generates and displays a list including the determined candidate for icon password and the corresponding keyword phrase (S14). Then, the user may refer to the keyword phrase when selecting an icon password through the list displayed on the icon password setting apparatus 1.

When the user selects an icon password and requests the setting as a user password, the icon password setting apparatus 1 stores the requested icon password as a user password (S15).

Subsequently, when a password input event from the user takes place, the icon password setting apparatus 1 displays a password input display, compares the icon password selected by the user to the pre-stored user password, and when they are found identical as a result of the comparison, determines authentication as a success (S16).

According to another exemplary embodiment of the present disclosure, S11 through S16 may be performed by the password server 3. The password server 3 receives icon and keyword data from a server-side operator and registers it (S11). When a password setting event from the user terminal 2 takes place, the password server 3 determines a candidate password by a combination or retrieval method (S12). The password server 3 determines a keyword phrase of the candidate password by a combination or retrieval method (S13). The password server 3 provides the user terminal 2 with a list including at least one password and its keyword phrase (S14). The password server 3 receives a request for password setting from the user terminal 2 and stores the received icon password as a user password (S15). Subsequently, when a password authentication event from the user terminal 2 takes place, the password server 3 receives a request for password authentication, compares the received icon password to the pre-stored password, and determines whether to authenticate the user password based on a result of the comparison (S16).

Further, according to further another exemplary embodiment of the present disclosure, in place of recommending the icon password through the list in S14, an icon password setting display may be provided. When the user inputs an icon password as a candidate on the setting display, a keyword phrase of the candidate password is provided to the setting display. Thus, each time the user inputs a candidate for icon password, the user may set a desired icon password as a user password by referring to a received keyword phrase.

In the foregoing exemplary embodiments, the term "~unit" is not used to represent hardware components of the icon password setting apparatus 1. Thus, a plurality of components may be integrated into one component, and one component may be divided into a plurality of components. Also, the components may represent hardware components, but may also represent software components. Accordingly, it should be understood that the present disclosure is not specially limited by the term "~unit".

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. An icon password setting apparatus which performs password setting based on an icon using a keyword associated with an image of the icon, the icon password setting apparatus comprising a computer terminal or a smart terminal having processing capabilities and being configured to implement:
    a password management unit configured to combine a plurality of icons among an entire icon to generate a plurality of possible icon passwords for a password, or to retrieve pre-stored icon passwords;
    a keyword phrase management unit configured to combine keywords of the individual icons constituting the icon password to generate keyword phrases, or to retrieve keyword phrases corresponding to the pre-stored icon passwords;
    a password list generating unit configured to generate a list including the icon passwords and the corresponding keyword phrases;
    a user password setting unit configured to receive a request for password setting for the icon password selected from the list, and set the icon password as a user password; and
    an icon registration unit configured to register an icon and at least one keyword associated with an image of the icon, wherein the icon password setting apparatus is configured to sort and store the registered keyword into any one category among a plurality of categories including constituents of sentence and parts of speech.

2. The icon password setting apparatus according to claim 1, wherein the icon password setting apparatus is constructed as a local user terminal of a stand-alone environment or a server of a wired/wireless network environment, and
    when the icon password setting apparatus is constructed as the server, the icon password setting apparatus is configured to transmit the list using the network and receive the icon password selected by a user from the list.

3. The icon password setting apparatus according to claim 1, wherein the icon password setting apparatus is configured to generate a keyword phrase of the icon password in accordance with a combination rule using the category of the keyword.

4. The icon password setting apparatus according to claim 1 or 2, further comprising:
    a user password authentication unit configured to receive a request for user authentication of the icon password selected by the user, compare the requested icon password to the pre-stored user password, and determines user authentication as a success when the requested icon password matches the pre-stored user password.

5. An icon password setting apparatus which performs password setting based on an icon using a keyword associated with an image of the icon, the icon password setting apparatus comprising a computer terminal or a smart terminal having processing capabilities and being configured to implement:
    a password management unit configured to combine a plurality of icons among an entire icon to generate a plurality of possible icon passwords for a password, or to retrieve pre-stored icon passwords;
    a keyword phrase management unit configured to combine keywords of the individual icons constituting the icon password to generate keyword phrases, or to retrieve keyword phrases corresponding to the pre-stored icon passwords;
    a password setting management unit configured to receive a selection of an icon password using a setting display where icons are arranged, and provide the keyword phrases corresponding to the icon passwords to the setting display;
    a user password setting unit configured to receive a request for password setting for the icon password selected through the setting display, and set the icon password as a user password; and
    an icon registration unit configured to register an icon and at least one keyword associated with an image of the icon, wherein the icon password setting apparatus is configured to sort and store the registered keyword into any one category among a plurality of categories including constituents of sentence and parts of speech.

6. An icon password setting method by which an icon password setting apparatus performs password setting based on an icon using a keyword associated with an image of the icon, the icon password setting method comprising:
    (a) an icon registration step for registering an icon and at least one keyword associated with the image of the icon, by the icon password setting apparatus, wherein the icon password setting apparatus sorts and stores the registered keyword into any one category among a plurality of categories including constituents of sentence and parts of speech;
    (b) a password management step for combining a plurality of icons among an entire icon to generate a plurality of possible icon passwords for a password, or retrieving pre-stored icon passwords;
    (c) a keyword phrase management step for combining keywords of the individual icons constituting the icon password to generate keyword phrases, or retrieving keyword phrases corresponding to the pre-stored icon passwords;
    (d) a password list generating step for generating a list including the icon passwords and the corresponding keyword phrases; and (e) a user password setting step for receiving a request for password setting for the icon password selected from the list, and setting the icon password as a user password.

7. The icon password setting method according to claim 6, wherein the step (c) comprises generating a keyword phrase of the icon password in accordance with a combination rule using the category of the keyword, by the icon password setting apparatus.

8. The icon password setting method according to claim 6, further comprising:
(f) a user password authentication step for receiving a request for user authentication of the icon password selected by the user, comparing the requested icon password to the pre-stored user password, and determining user authentication as a success when the requested icon password matches the pre-stored user password, by the icon password setting apparatus.

9. An icon password setting method by which an icon password setting apparatus performs password setting based on an icon using a keyword associated with an image of the icon, the icon password setting method comprising:
(a) an icon registration step for registering an icon and at least one keyword associated with the image of the icon, by the icon password setting apparatus, wherein the icon password setting apparatus sorts and stores the registered keyword into any one category among a plurality of categories including constituents of sentence and parts of speech;
(b) a password management step for combining a plurality of icons among an entire icon to generate a plurality of possible icon passwords for a password, or retrieving pre-stored icon passwords;
(c) a keyword phrase management step for combining keywords of the individual icons constituting the icon password to generate keyword phrases, or retrieving pre-stored keyword phrases corresponding to the icon passwords;
(d) a password setting management step for receiving a selection of an icon password using a setting display where icons are arranged, and providing the keyword phrase corresponding to the icon passwords to the setting display; and
(e) a user password setting step for receiving a request for user password setting for the icon password selected through the setting display, and setting the icon password as a user password.

\* \* \* \* \*